United States Patent
Kamba (12)

(10) Patent No.: US 6,266,775 B1
(45) Date of Patent: Jul. 24, 2001

(54) METHOD AND APPARATUS FOR DISPLAYING INFORMATION AND INFORMATION RECORDING MEDIUM HAVING INFORMATION DISPLAYING MEANS

(75) Inventor: Tomonari Kamba, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/138,534

(22) Filed: Aug. 24, 1998

(30) Foreign Application Priority Data

Aug. 25, 1997 (JP) .................................................. 9-228048

(51) Int. Cl.⁷ .................................................. G06F 11/00
(52) U.S. Cl. ..................................... 713/202; 340/825.34
(58) Field of Search .................................... 713/202, 200, 713/201; 340/825.34, 825.31; 382/118, 119; 709/200–203, 225; 380/3, 4, 25

(56) References Cited

U.S. PATENT DOCUMENTS

| | | | |
|---|---|---|---|
| 5,067,154 | * 11/1991 | Hosobuchi et al. | 380/25 |
| 5,107,443 | * 4/1992 | Smith et al. | 395/158 |
| 5,138,711 | * 8/1992 | Miyoshi et al. | 395/600 |
| 5,633,726 | * 5/1997 | Timmermans | 386/70 |
| 5,798,708 | 8/1998 | Katayama | 340/825.44 |
| 5,819,284 | 10/1998 | Farber et al. | 707/104 |
| 5,828,834 | * 10/1998 | Choi | 395/188.01 |
| 5,930,274 | * 7/1999 | Kaniwa et al. | 371/57.1 |
| 5,949,882 | * 9/1999 | Angelo | 380/25 |
| 5,987,134 | * 11/1999 | Shin et al. | 380/25 |
| 6,092,197 | * 7/2000 | Coueignoux | 713/200 |

FOREIGN PATENT DOCUMENTS

| | | |
|---|---|---|
| 0749081 | 12/1996 | (EP) . |
| 6-276221 | 9/1994 | (JP) . |
| 8-035648 | 11/1996 | (JP) . |
| 8-305648 | 11/1996 | (JP) . |
| 8-314402 | 11/1996 | (JP) . |
| 8-314900 | 11/1996 | (JP) . |
| 8-340566 | 12/1996 | (JP) . |

* cited by examiner

Primary Examiner—Nadeem Iqbal
(74) Attorney, Agent, or Firm—Foley & Lardner (57) ABSTRACT

An information displaying apparatus connected to a communication network, for displaying information received through the communication network on display unit, instead of a periodically changed pattern during operation of a screen saver function for displaying the pattern on the display unit includes: an information storing unit for in turn storing the information received through the communication network; a private information discriminating unit in turn read out the information stored in the information storing unit, for discriminating whether or not the read information is private information; and an information display control unit for directly displaying the read information on the display unit in case where the read information is non-private information, and displaying the read information on the display unit with a predetermined operation provided for the apparatus by a user in case where the read information is private information, in response to a discriminating result of the private information discriminating means, thereby enabling the private information to avoid exposing to a third party, but non-private information can be seen immediately after returning to the work.

13 Claims, 8 Drawing Sheets

| information classification | Private information? |
|---|---|
| information for newspaper | NO |
| sales information | NO |
| personnel information | YES |

METHOD AND APPARATUS FOR DISPLAYING INFORMATION AND INFORMATION RECORDING MEDIUM HAVING INFORMATION DISPLAYING MEANS

BACKGROUND OF THE INVENTION

1. Field of the Invention

The present invention relates to a method and apparatus for displaying information and an information recording medium having information display means, for displaying such as characters and images on a display unit in which they are supplied through a communication network.

2. Description of the Related Art

There has been proposed an information display apparatus having a screen saver function incorporated in a display unit used for a personal computer and the like. The screen saver is a function for displaying a screen saver image containing patterns of various periodically variations for purpose of preventing the characters and images from burning image that interrupts the display on the screen. Such burning image is caused by displaying characters or images on the screen of display unit for long hours in the case where a predetermined operation such as a specific key-in operation is not performed. Accordingly, the screen saver images are used for preventing the screen from the burning image, which has not dealt with specifically so far.

Figure 8:
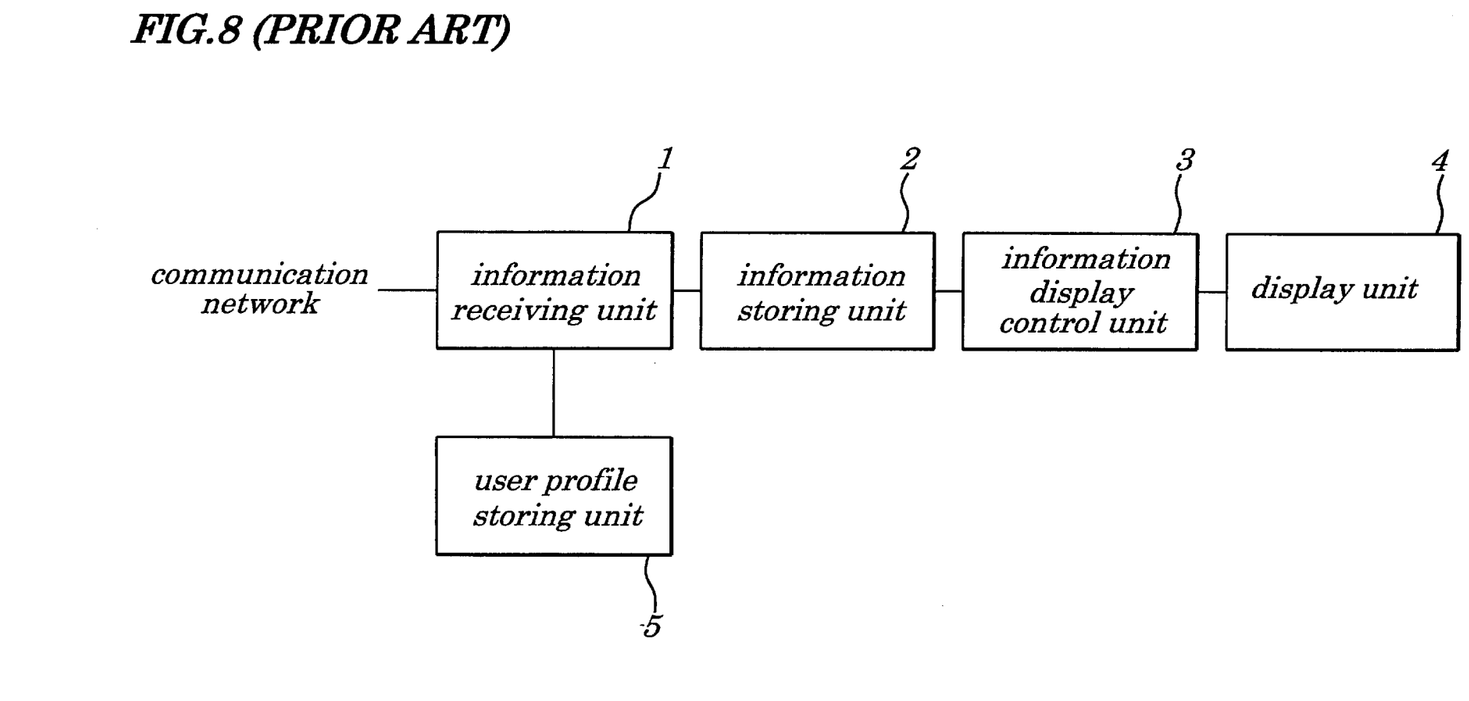
FIG. 8 is an electrical block diagram showing an information displaying apparatus for explaining a related art.

Japanese Patent Laid-open Gazette 8-305648 discloses an information displaying apparatus having a function for storing information such as characters and images received through a communication network and in turn displaying it on a display unit. It is used for not only preventing the burning image, but also displaying useful information on the display unit with use of a time during operation of a screen saver function. FIG. 8 is an electrical block diagram showing an information displaying apparatus which substantially includes an information receiving unit 1, an information storing unit 2, an information display control unit 3, displaying unit 4 and a user profile storing unit 5.

Such apparatus operates as follows. The information receiving unit 1 refers to user information stored in the user profile storing unit 5 and receives information such as characters and images of interest for a user through a communication network, and thereafter stores the information into the information storing unit 2. The information display control unit 3, in turn, reads out the information stored in the information storing unit 2 and displays it on the display unit 4 in the case where the screen saver function is being operated in the information displaying apparatus.

According to such constitution described above, the user can effectively and readily utilize necessary information for he/herself without a specific operation, since new and interesting information at all times can be received through the communication network and in turn displayed on the display unit 4. On the other hand, the user can immediately find the information at a time of returning to his/her display unit since personally necessary information is received through the communication network and in turn displayed on the display unit 4 even while the user is away from his/her desk.

In addition, Japanese Patent Laid-open Gazette 8-314402 discloses a technological art for varying motions and the like of screen saver images in response to inputted sounds in an information displaying apparatus having the screen saver function.

Besides such information displaying apparatuses, there have found a point that personnel information is unexpectedly exposed to a third party even though the user does not want them to see the information while he or she leaves his/her desk. This is because the information is in turn read out and displayed on the displaying unit 4 during the operation of screen saver function. For example, in the case where a person in charge of personnel matters in a company uses the information displaying apparatus, such personnel matters should not be exposed to a third party. However, they may unexpectedly be exposed when the person forgets to turn a switch off and runs the screen saver function while leaving his/her desk.

Such situation could occur when an information provider provides information for a user through a communication network, that is, it could occur even though the information provider provides the information only for the user but does not wish a third party to see the information. Particularly, the situation may occur in the case where the user operates to display electronic mail on the display unit 4 during the operation of a screen saver function.

SUMMARY OF THE INVENTION

It is therefore an object of the present invention to provide a method and apparatus for displaying information and information recording medium having information display means capable of effectively and readily utilizing necessary information while protecting secrecy of the information.

According to a first aspect of the present invention, there is provided an information displaying method, performed by an information displaying apparatus connected to a communication network, of displaying information received through the communication network on a display unit, instead of a periodically changed pattern during operation of a screen saver function for displaying the pattern on the display unit to prevent the received information from a burning image on the display unit at a time without having a predetermined time key-in operation, in which the information received through the communication network is discriminated whether or not the received information is private; the received information is directly displayed on the display unit in the case where the information is non-private; and the received information is displayed on the display unit with a predetermined operation provided for the apparatus by a user in the case where the information is private.

The discrimination of whether the information is private is performed in response to previously determining which information is set to be private by the user.

The discrimination of whether the information is private is performed in response to determining whether data is present or absent in the information, the data being added to the information as private information by an information provider to be set to the private information.

The predetermined operation is that the user enters a predetermined password into the apparatus.

The information is information belonging to a field interest for the user using the apparatus and information corresponding to an attribute of the user, which is received through the communication network.

According to a second aspect of the present invention, there is provided an information displaying apparatus connected with a communication network, for displaying information received through the communication network on a display unit, instead of a periodically changed pattern during operation of a screen saver function for displaying the pattern on the display unit to prevent the received information from a burning image on the display unit at a time without having a predetermined time key-in operation, comprising: an information storing unit for in turn storing the information received through the communication network; a private information discriminating unit in turn read out the information stored in the information storing unit, for discriminating whether or not the read information is private; and an information display control unit for directly displaying the read information on the display unit in the case where the read information is non-private, and displaying the read information on the display unit with a predetermined operation provided for the apparatus by a user in the case where the read information is private, in response to a discriminating result of the private information discriminating unit.

The information displaying apparatus also includes a private information classified storing unit for storing a previously determined data of determining which information is set to be private by the user, the private information discriminating unit referring to the private information classified storing unit to discriminate whether or not the read information is private.

The private information discriminating unit discriminates private information whether data is present or absent in the read information, the data being added to the information by an information provider to be set to the private information.

The predetermined operation is that the user enters a predetermined password into the apparatus.

The information stored in the information storing unit is information belonging to a field interest for the user using the apparatus, and information corresponding to an attribute of the user.

According to a third aspect of the present invention, there is provided an information recording medium having computer readable program means executed in a data processing system including a memory and processor, for displaying information received through a communication network on display means, instead of a periodically changed pattern during operation of a screen saver function for displaying the pattern on the display means to prevent the received information from a burning image on the display means at a time without having a predetermined time key-in operation, the computer readable program means comprises: an information storing-program code unit for in turn storing the information received through the communication network in the memory; a private information discriminating-program code unit in turn read out the information stored in the memory, for discriminating whether or not the read information is private information; and an information display control-program code unit for directly displaying the read information on the display means in case where the read information is non-private information, and displaying the read information on the display means with a predetermined operation provided for the apparatus by a user in case where the read information is private information, in response to a discriminating result of the private information discriminating means.

According to the aspects described above, user can readily utilize the information as the information secrecy or security is maintained without requiring specific operation, in which the information is newly received through the communication network at all the times. The information is directly displayed on the display unit in the case where it is not private information while the information is displayed thereon with a predetermined operation in the case where it is private information. Even though the information is displayed on the display unit by receiving it through the communication network while the user leaves his/her desk, private information is not displayed thereon as long as a password of the user is not entered into the apparatus, enabling the private information to avoid exposing to a third party. On the other hand, non-private information can be seen immediately after returning to his/her desk.

BRIEF DESCRIPTION OF THE DRAWINGS

The above and other objects, advantages and features of the present invention will be more apparent from the following description taken in conjunction with the accompanying drawings in which.

DESCRIPTION OF THE PREFERRED EMBODIMENTS

Hereinafter, embodiments of the present invention will be described with reference to the drawings.

(First Embodiment)

Figure 1:
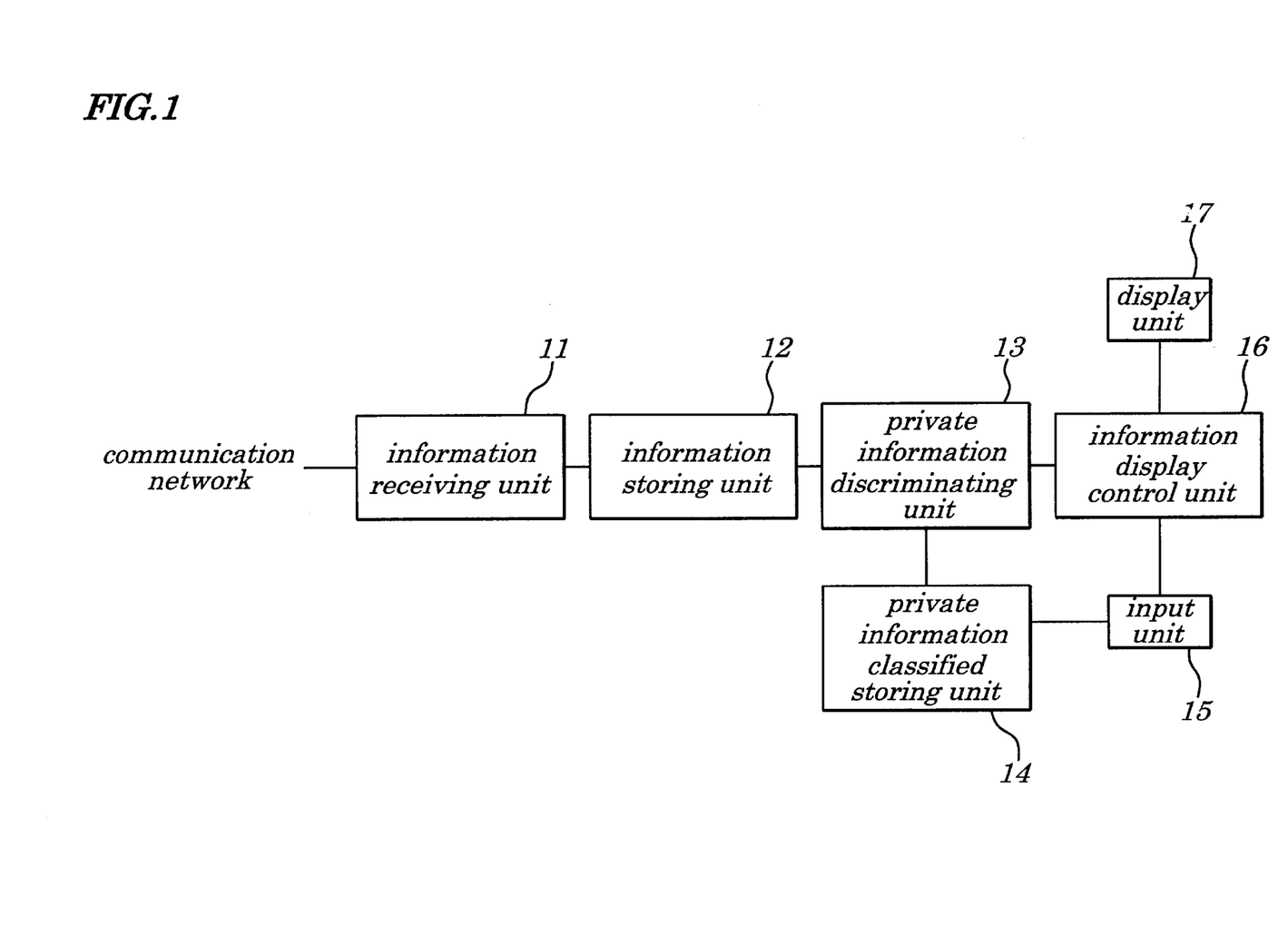
FIG. 1 is an electrical block diagram showing an information displaying apparatus of a first embodiment in the present invention.

FIG. 1 is an electrical block diagram showing an information displaying apparatus of a first embodiment in the present invention.

The information displaying apparatus substantially includes an information receiving unit 11, an information storing unit 12, a private information discriminating unit 13, a private information classified storing unit 14, an input unit 15, an information display control unit 16 and a display unit 17.

The information receiving unit 11 having interface boards used for communication is controlled by a communication control program to receive information such as characters and images from other information displaying apparatuses including communication devices connected with the apparatus itself through a communication network. The information is of such news article, electronic mail, general text data, and reply messages obtained from an information provider for which a user requests through the communication network. The information storing unit 12 has recording medium such as a semiconductor memory like RAM, FD (Floppy Disk) and HD (Hard Disk), for storing the received information.

The private information discriminating unit 13 includes a microprocessor to refer to a private information classified table stored in a private information classified storing unit 14. It therefore discriminates whether or not the information stored in the information storing unit 12 is private, and also discriminates whether or not the information read out from the information storing unit 12 has a tag (described later) to decide whether the information is private.

The private information classified storing unit 14 is a recording medium including a semiconductor memory such as RAM, FD, HD and the like to store the private information classified table indicating which information is private.

Figure 2:
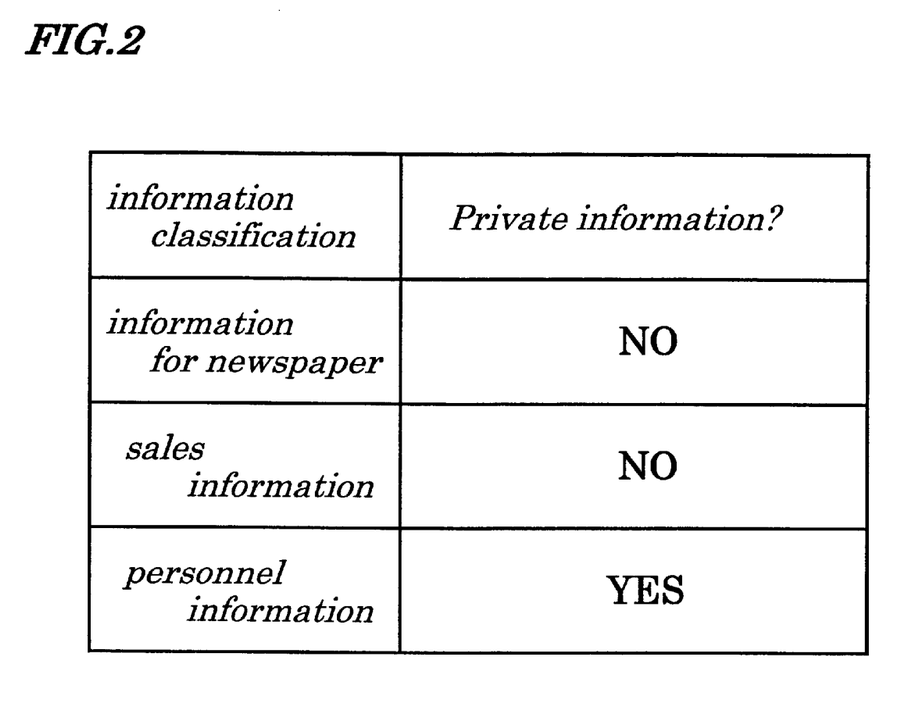
FIG. 2 is an explanatory diagram showing a private information classified table.

One type of private information has a so-called tag added to the information in transmission. This is used for insuring that only a user receives the information such as a "confidential" letter provided by the information provider through the communication network in transmitting the information to the user. Another type of private information is formed when a user decides as to which type of information is private. For example, in the case where a chief of a sales department uses the apparatus of the present invention, sales information such as the results of a specific section and information such as from a newspaper indicating a new product for the competitor, are not required to be private or confidential. However, in the case where information such as unofficially decided personnel matters should be private, the chief enters a tag through the input unit 15. As a result of the operation, the personnel information is set to be private and stored in the private information classified table in the private information classified storing unit 14 shown in FIG. 2.

Referring back to FIG. 1, the input unit 15 is a keyboard having ten-keys and function keys, and a pointing device such as a mouse from which a user enters a tag or password to display private information on the display unit 17 and also sets specific information to be private.

The information display control unit 16 is a microprocessor and the like which controls the direct display of non-private information on the display unit 17 on the basis of discriminated result by the private information discriminating unit 13. On the other hand, the private information is not displayed on the display unit 17, or displayed as "received private information" on the unit.

The display unit 17 is a CRT display and the like to display characters and images.

Figure 3:
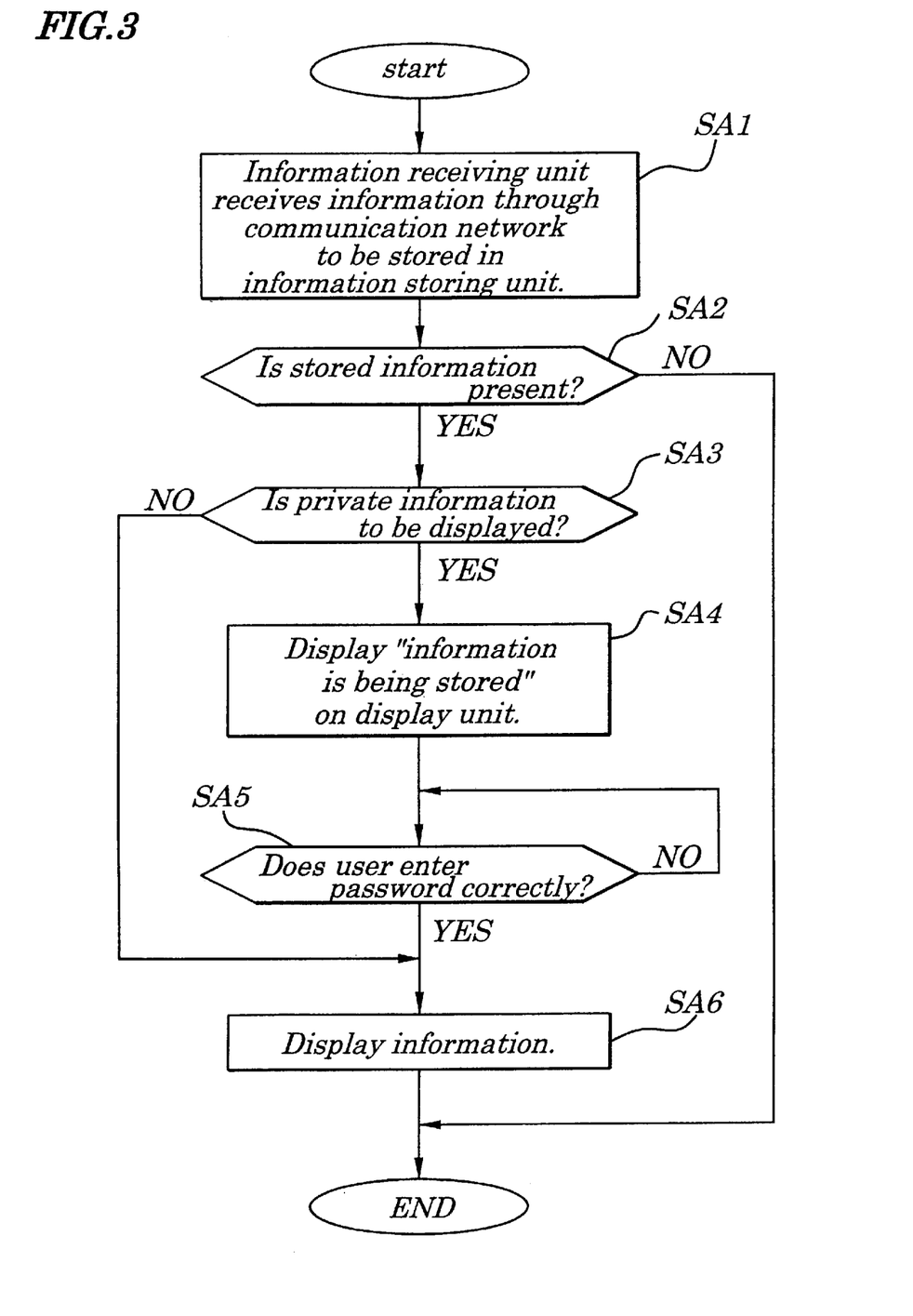
FIG. 3 is a flow chart showing operation of the information displaying apparatus.
Figure 4:
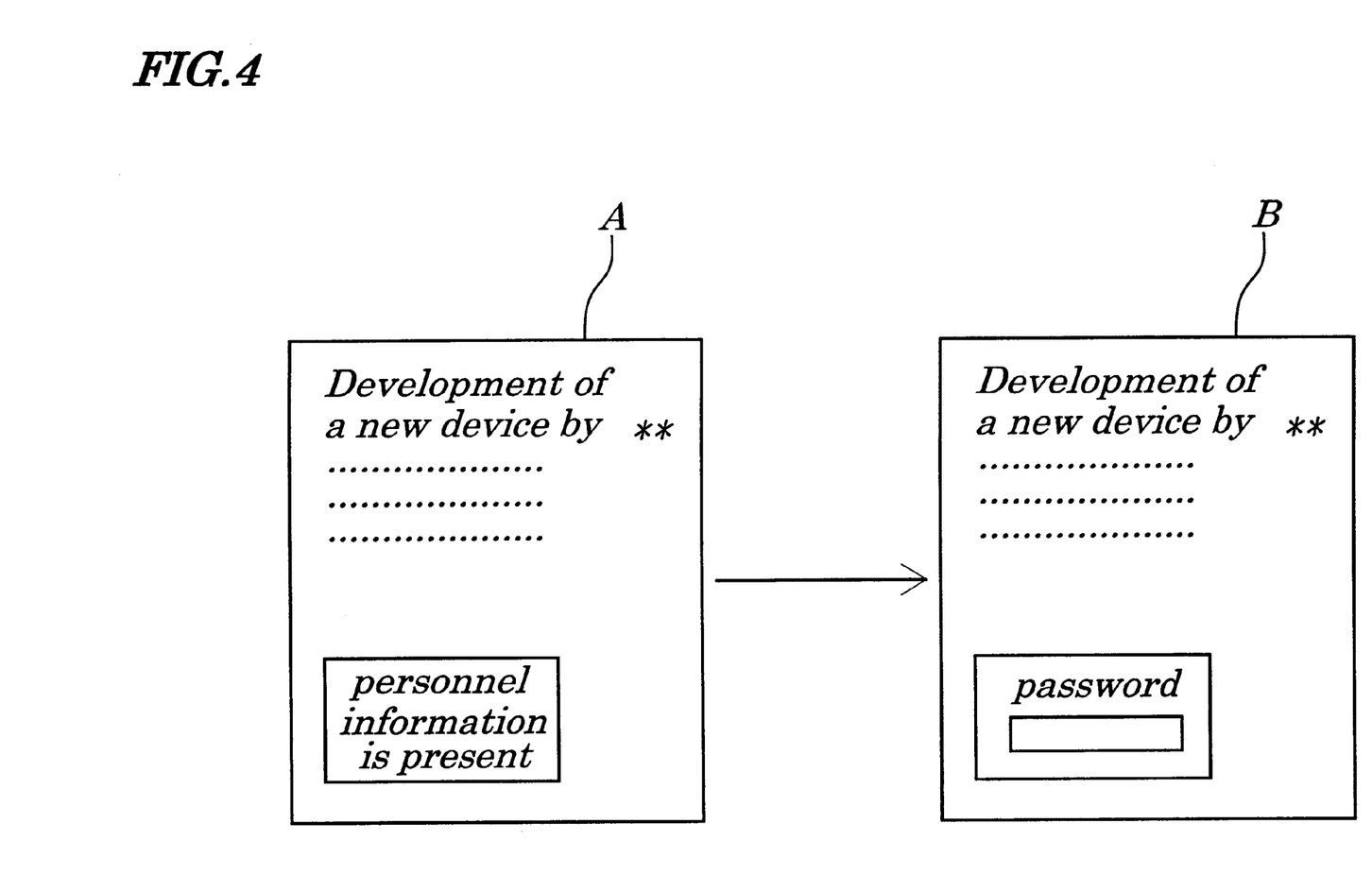
FIG. 4 is an explanatory diagram showing a switching state of a display unit.

Referring to FIGS. 1, 3 and 4, operation of the information displaying apparatus will be described below.

In step SA1 shown in FIG. 3, when the information receiving unit 11 receives information such as characters and images from another information displaying apparatus and other communication apparatuses through the communication network, the information is stored in the information storing unit 12. The process then forwards to step SA2. The information is, for example, of news article, electronic mail, general text data, and reply messages obtained from an information provider (or information server) for which a user requests through the communication network. It is noted that a detailed method of requesting desirable information for the information server and obtaining its reply message through the communication network should be referred to Japanese Patent Laid-open Gazette No. 8-305648.

In the step SA2, the private information discriminating unit 13 discriminates whether or not the information is stored in the information storing unit 12. If a result is "NO", the subsequent process is terminated.

If the discriminated result is "YES", or the information is being stored in the information storing unit 12, the process moves to step SA3 in the private information discriminating unit 13.

In the step SA3, the private information discriminating unit 13 reads out the information from the information storing unit 12 in the order of storing the information therein and refers to the private information classified table stored in the private information classified storing unit 14. It then discriminates whether or not the information is private and whether or not the information has a tag indicating private information. If a result is "NO", the process forwards to step SA6.

If the result is "YES" or the information to be displayed is private, the process forwards to step SA4.

In the step SA4, the information display control unit 16 controls to display only a message indicating that the information is being stored therein on the display unit 17 in the case where the screen saver function is being run in the information displaying apparatus. For example, a button indicating "personnel information is present" is displayed on a screen A shown in FIG. 4 for personnel information which is private. Other indications may be applicable such as "new information has arrived" and an icon may also be applicable. The process then moves to step SA5.

In the step SA5, a user pushes the button indicating "personnel information is present" displayed on the display unit 17 or clicks the mouse with a cursor placed on a predetermined position to thereby select whether the personnel information is to be displayed. Thereafter, a password input area for inputting a password is displayed on the display unit 17, and the information display control unit 16 decides whether the password inputted by the user through the input unit 15 is correct or not. If a result is "NO", the process for decision is repeated. The decision becomes "YES" in step the SA5 if the user enters his password through the input unit 15 correctly, then the process forwards to step SA6.

In the step SA6, the information display control unit 16 controls the information read out from the information storing unit 12 to display same on the display unit 17. Such display may be used as a method disclosed in Japanese Patent Laid-open Gazette No. 8-305648 or any other method may be applicable. In an example shown in FIG. 4, the information for a newspaper which is not private is directly displayed on the display unit 17 in the order of reading the information from the information storing unit 12. In the case of personnel information, the button indicating "personnel information is present" is displayed on the lower portion of display unit 17. When the button is depressed, the password entering area is displayed on a screen B shown in FIG. 4. The user enters his password correctly and the personnel information is then displayed on the lower portion of display unit 17.

(Second Embodiment)

A second embodiment will be described below.

Figure 5:
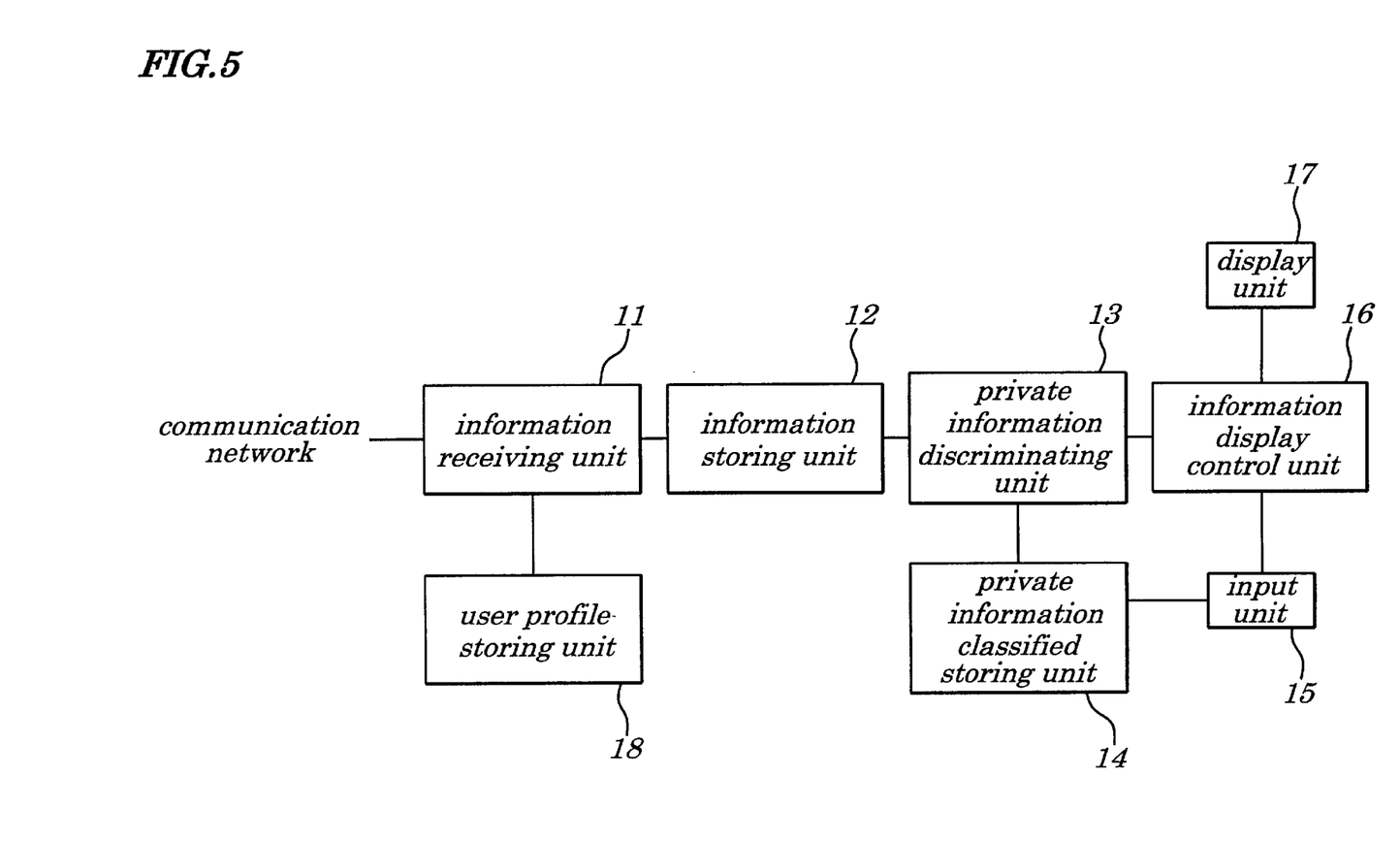
FIG. 5 is an electrical block diagram showing an information displaying apparatus of a second embodiment in the present invention.

FIG. 5 is an electrical block diagram showing an information displaying apparatus of the second embodiment in the present invention. Referring to FIG. 5, the same reference numerals in FIG. 1 are used in FIG. 5 for the same construction elements, therefore, detailed descriptions for these are omitted. The information displaying apparatus has a newly added user profile storing unit 18.

The user profile storing unit 18 includes a recording medium such as a semiconductor memory like RAM, FD, HD and the like in which user information is stored necessary for selecting such as characters and images of interest for the user by an information receiving unit 11. The user information includes keywords of fields such as sports, hobbies and the like interest for users and user attributions (ex. sex, age, job, hobby and the like), which is entered by a user through the input unit 15.

Figure 6:
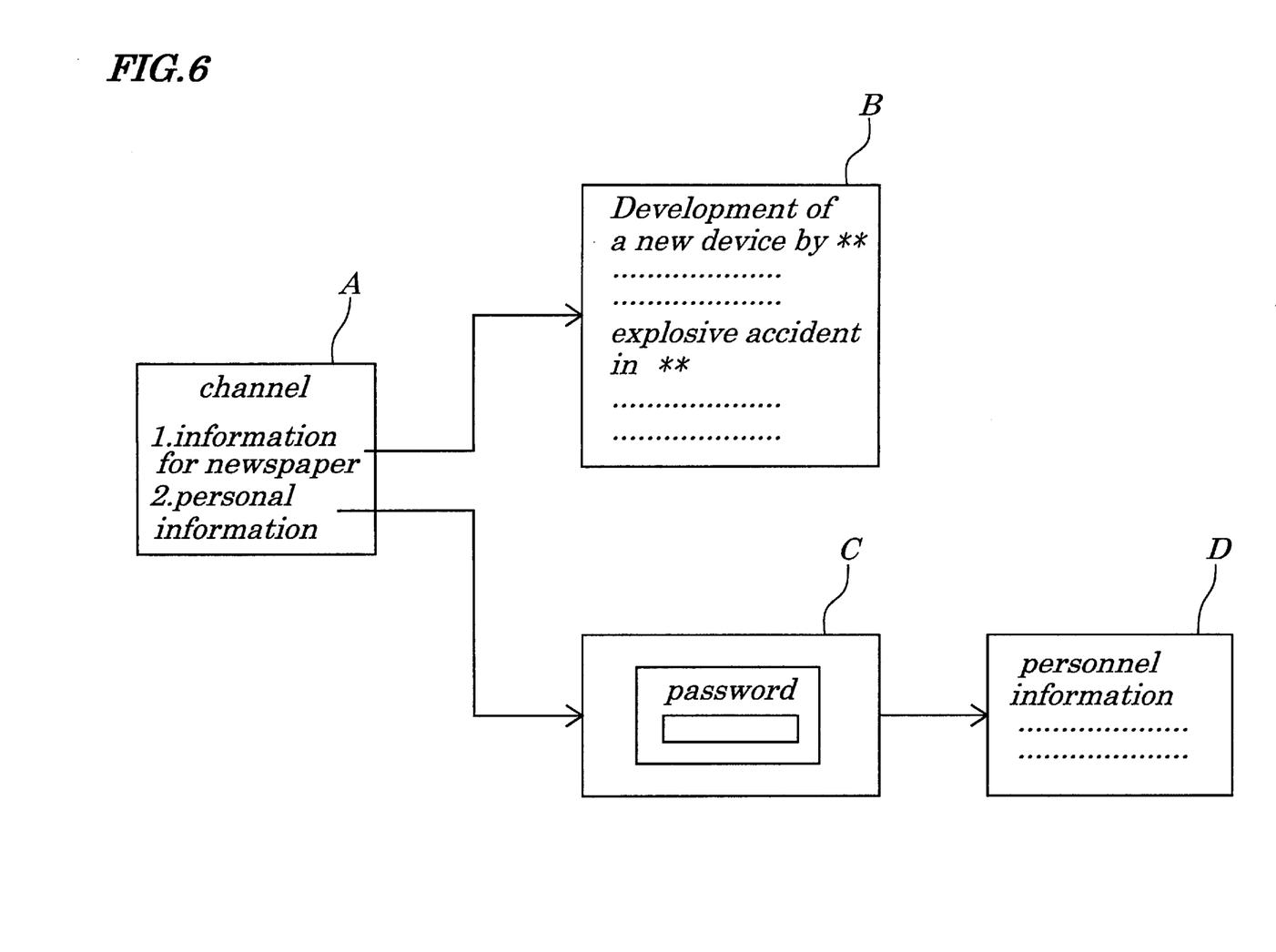
FIG. 6 is an explanatory diagram showing a switching state of the display unit.

In the case of second embodiment, the display on display unit 17 is changed as shown in FIG. 6. That is, a plurality of channels are provided for selecting information to be displayed on the display unit 17 while the screen saver function is being run. Therefore, information for a newspaper is selected with a channel 1 while personnel information is selected with a channel 2 in the case shown in FIG. 6. As is similar to the first embodiment, the information for the newspaper is not private and the personnel information is private. The user can select either the channel 1 or 2 through the input unit 15 and such selected result is stored in the private information classified storing unit 14.

Operation of the information displaying apparatus in the second embodiment will be described with reference to FIGS. 5, 6 and 7.

Figure 7:
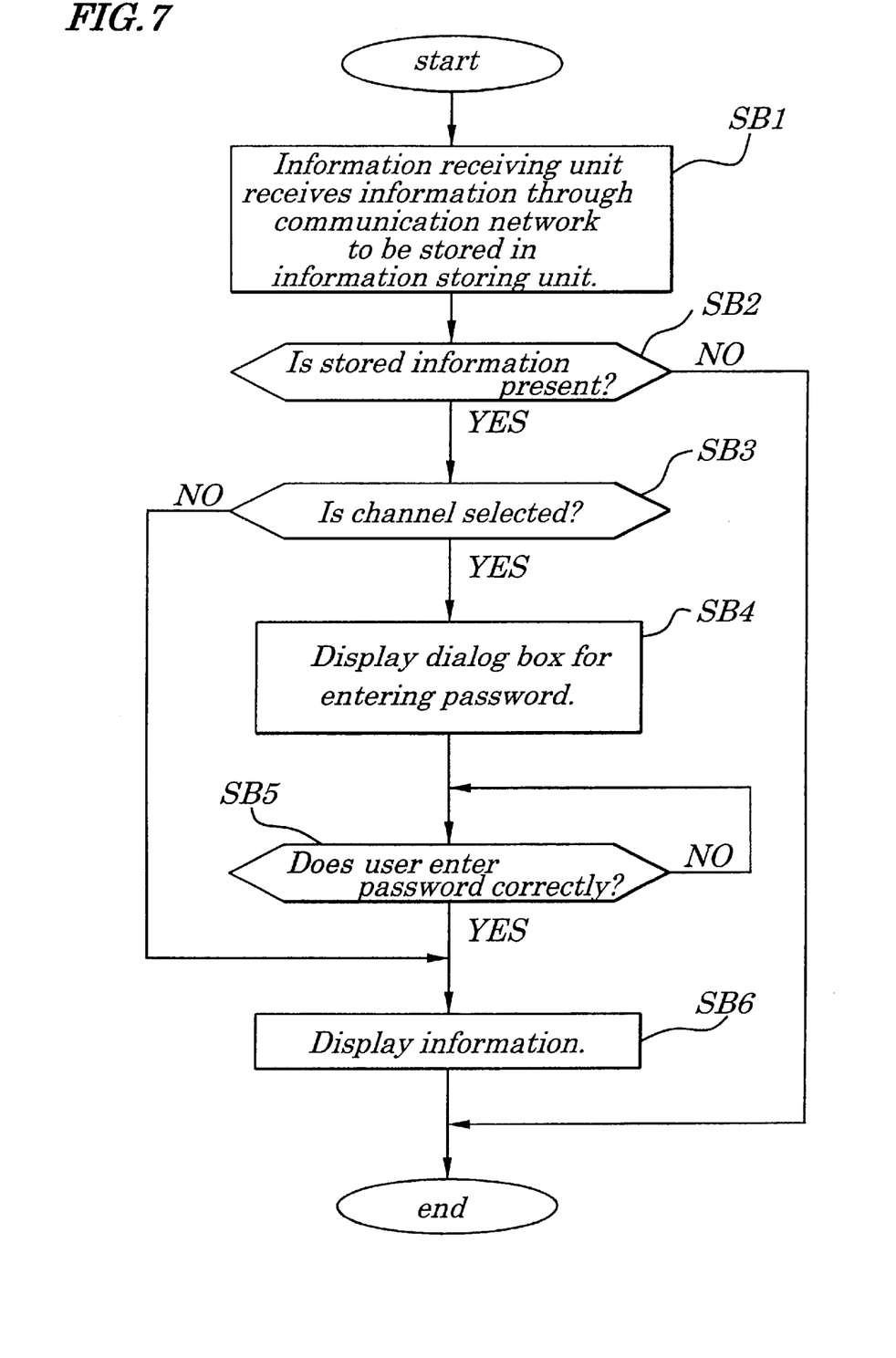
FIG. 7 is a flow chart showing operation of the information displaying apparatus.

In step SB1 shown in FIG. 7, the information receiving unit 11 refers to user information stored in the user profile storing unit 18 and receives only information such as characters and images of interest for the user from other information displaying apparatuses including communication devices through the communication network. Thereafter, the information is classified by the fields and the user attributions to be stored in the information storing unit 12. The process then forwards to step SB2.

In the step SB2, the private information discriminating unit 13 discriminates whether or not the information storing unit 12 stores the information. If a result is "NO", a subsequent process is terminated.

If the result is "YES" in the step SB2 or the information is being stored in the information storing unit 12, the process then forwards to step SB3.

In the step SB3, the private information discriminating unit 13 reads out the information stored in the information storing unit 12 in the order of the stored information and refers to a private information classified table present in the private information classified storing unit 14. It then discriminates whether the information is personnel information which is private or information or newspaper information which is not private. It also discriminates whether or not the information has a tag indicating whether the information is of the personnel information which is private or the information from a newspaper which is not private. The information from the newspaper is then classified as the channel 1 while the personnel information is classified as the channel 2.

Subsequently, the private information discriminating unit 13 refers to the private information classified storing unit 14 to discriminate whether or not the channel 2 is selected, or whether or not the display for personnel information is selected as is private. If a result is "NO" or if the channel 1 is selected for displaying information for the newspaper as is not private, the process forwards to step SB6.

If the result is "YES" in the step SB3 or the channel 2 is selected for displaying the personnel information as is private, the process forwards to step SB4.

In the SB4, when the screen saver function is being run in the apparatus, the information display control unit 16 controls to display a dialog box for entering a password on the display unit 17 as an image C shown in FIG. 6. The process then forwards to step SB5.

In the step SB5, the information display control unit 16 decides whether or not the user correctly enters his password through the input unit 15. If a result is "NO", this deciding process is repeated. If the user enters the password correctly through the input unit 15, the result becomes "YES". The process then forwards to step SB6.

In the step SB6, the information display control unit 16 controls to display the information read out from the information storing unit 12 on the display unit 17. That is, in the case of selecting the channel 1, the information for newspaper as is non-private information is displayed on the display unit 17 in the order of read information from the information storing unit 12 as a screen B shown in FIG. 6. While in the case of selecting the channel 2, the personnel information as is private information is displayed on the display unit 17 in the order of read information from the information storing unit 12 as screens C and D shown in FIG. 6 when entering the password correctly.

Although the embodiments of the present invention have been described, the following examples are also included in the present invention.

For example, the hardware constitutions have been described mainly in the embodiments, however, the functions of private information discriminating unit 13 and information display control unit 16 may be stored in a recording medium (or semiconductor memory such as ROM, RAM and the like, FD, HD and CD-ROM) as screen saver display program. This is because the information displaying apparatus generally constitutes a personnel computer together with interface boards having modem used for the communication.

In such cases, the communication interface boards serve as the information receiving unit 11. The recording medium serves as information storing unit 12. The private information classified storing unit 14 and user profile storing unit 18, input devices such as keyboard and mouse constituted of a personnel computer serve as input unit 15. A display device together with the computer serves as display unit 17. Accordingly, the screen saver display program is read from the recording medium into a CPU (Central Processing Unit) in the personnel computer, running the program in the CPU. Starting the screen saver display program functions as operations of private information discriminating unit 13 and information display control unit 16 described above.

The personnel information is private in the embodiments described above. However, the private or secret degree of the information may be classified as three: firstly, an official notification already issued is not required to be private; secondly, an unofficially decided matters for regular workers are not highly private information; and thirdly, the information for an administrative post is relatively high. According to such classification, difficulties of the operation may be provided for displaying the information on the display unit 17 due to maintaining secrecy.

It is thus apparent that the present invention is not limited to the above embodiments but may be changed and modified without departing from the scope and spirit of the invention.

Finally, the present application claims the priority of Japanese Patent Application No. Hei09-228048 filed Aug. 25, 1997, which is incorporated herein by reference.

What is claimed is:

1. An information displaying method, performed by an information displaying apparatus connected to a communication network, for displaying information received through the communication network on a display unit, comprising:

receiving information through the communication network;

determining whether or not the received information is private;

providing a screen saving function by automatically directly displaying the received information on the display unit in case where the information is not private; and displaying the received information on the display unit only after a predetermined operation provided for the apparatus by a user is successfully completed in case where the information is private.

2. A method according to claim 1, wherein determining whether the information is private is performed in response to previously determining which information is set to be private by the user.

3. A method according to claim 1, wherein determining whether the information is private is performed in response to determining whether data is present or absent in the information, the data being added to the information as private information by an information provider.

4. A method according to claim 1, wherein the predetermined operation is that the user enters a predetermined password into the apparatus.

5. A method according to claim 1, wherein the information is information belonging to a field of interest for the user using the apparatus, and information corresponding to an attribute of the user, which is received through the communication network.

6. An information displaying apparatus connected with a communication network, for displaying information received through the communication network on display meaning comprising:

an information storing means for storing the information received through the communication network;

a private information discriminating means reading the information stored in the information storing means, for discriminating whether or not the read information is private information; and an information display control means responsive to a result of said private information discriminating means, for providing a screen saving function by automatically directly displaying the read information on the display means in case where the read information is non-private information, and displaying the read information on the display means only after a predetermined operation is provided for the apparatus by a user in case where the read information is private information.

7. An apparatus according to claim 6, wherein the information displaying apparatus also includes a private information classified storing means for storing a previously determined data of determining which information is set to be private by the user, the private information discriminating means referring to the private information classified storing means to discriminate whether or not the read information is private information.

8. An apparatus according to claim 6, wherein the private information discriminating means discriminates private information based on whether data is present or absent in the read information, the data being added to the information by an information provider as be set to the private information.

9. An apparatus according to claim 6, wherein the predetermined operation is that the user enters a predetermined password into the apparatus.

10. An apparatus according to claim 6, wherein the information stored in the information storing means is information belonging to a field of interest for the user using the apparatus, and information corresponding to an attribute of the user.

11. An information recording medium having a computer readable program executed in a data processing system including a memory and processor, for displaying information received through a communication network on a display the computer readable program executable on said data processing system for:

discriminating whether or not the information is private information; and providing a screen saving function by automatically directly displaying the information on the display in case where the information is non-private information, and displaying the information on the display only after a predetermined operation provided by a user in case where the information is private information.

12. An information recording medium according to claim 11, wherein the discriminating step refers to a private information classified table to discriminate whether or not the information is private information.

13. An information recording medium according to claim 11, wherein the discriminating step discriminates private information by whether data is present or absent in the information, the data being added to the information by an information provider to be set as private information.

* * * * *